Figure 1:
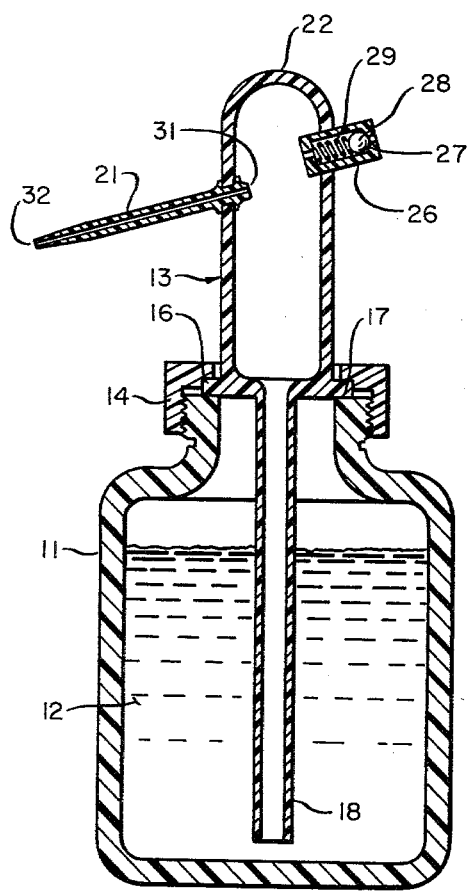

April 13, 1965  E. G. PICKELS  3,178,072

DISPENSING APPARATUS

Filed Dec. 1, 1961

EDWARD G. PICKELS
*INVENTOR.*

BY

*Flehr and Swain*

ATTORNEYS

United States Patent Office 3,178,072
Patented Apr. 13, 1965

3,178,072
DISPENSING APPARATUS
Edward G. Pickels, Atherton, Calif., assignor to Beckman Instruments, Inc., a corporation of California
Filed Dec. 1, 1961, Ser. No. 156,343
1 Claim. (Cl. 222—207)

One type of prior art dispensing apparatus includes a deformable reservoir serving to retain liquid to be dispensed, a chamber disposed above said reservoir, and means for transferring liquid between the reservoir and the chamber. A measuring tube adapted to retain a predetermined volume of liquid has one end extending into the chamber. An opening is provided in the chamber so that it may communicate with the surrounds.

In operation, the deformable reservoir is squeezed whereby liquid is forced upwardly into the chamber to submerge the end of the measuring tube. When the end of the measuring tube is submerged, the opening communicating with the surrounds is closed by placing a finger over the same. Pressure is created in the chamber and the liquid is forced into the measuring tube to fill it. The finger is removed from the opening when the tube is filled. A measured amount of liquid is then retained between the meniscuses formed at the ends of the measuring tube. The deformable reservoir is then released and the fluid flows from the chamber back into the reservoir. To dispense the measured amount of liquid retained in the tube, the opening communicating with the surrounds is again closed and the deformable reservoir squeezed whereby pressure is created in the chamber. This pressure urges the liquid outwardly from the measuring tube.

A pipette of the foregoing character requires that the squeezing of the reservoir and placing of the index finger be coordinated. When a dispenser of the foregoing character is used by skilled personnel, no difficulties arise. However, unskilled personnel may find it relatively difficult to coordinate the various motions.

A dispenser of the foregoing character is useful in dispensing drugs, prescriptions, and the like. However, such users would be unskilled. Consequently, such a dispenser is not suitable for use by the general public. The present usefulness is in laboratories where skilled personnel use the dispensing pipette to carry out chemical analyses, but even there a simplified operation is desirable.

It is a general object of the present invention to provide a dispenser of the foregoing character which is easy to manipulate and which may be used by unskilled people.

It is another object of the present invention to provide a dispenser of the foregoing character which includes automatic valve means whereby a liquid may be dispensed by two subsequent deformations of the reservoir, the first serving to fill the measuring tube and the second serving to deliver the known amount of liquid in the tube.

It is another object of the present invention to provide a dispensing apparatus of the type described which includes valve means designed so that the pressure differential required to activate the valve is less than that required to overcome the forces holding the liquid in the measuring tube and on which the differential pressure remains substantially constant during operation.

It is a further object of the present invention to provide a pipette of the foregoing character which is simple in construction and inexpensive to manufacture.

These and other objects of the invention will become more clearly apparent from the following description when taken in conjunction with the accompanying drawing.

Figure 2:
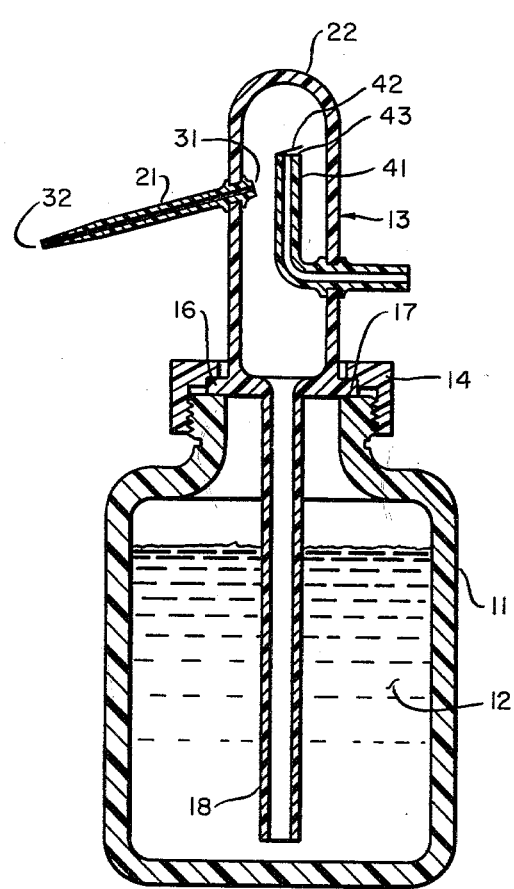

Referring to the drawing:

FIGURE 1 is an elevational view, partly in section, showing a dispenser in accordance with the present invention; and FIGURE 2 is an elevational view, partly in section, showing another embodiment of the invention.

The pipette illustrated in FIGURE 1 includes a deformable reservoir 11 which retains the liquid 12 which is to be dispensed. A chamber 13 is carried by the reservoir 11 and may be secured thereto by the threaded nut 14 which engages the rim or flange 16 formed on the chamber 13 and urges the same against the upper edge 17 of the reservoir neck to form a seal. A tube 18 is provided for communicating between the reservoir 11 and chamber 13 to permit transfer of liquid between the reservoir and chamber in both directions. Means are provided for forcing the liquid upward from the reservoir 11 into the chamber 13. Preferably, the reservoir is deformable whereby by squeezing, pressure is created to drive the fluid up into the chamber 13.

A pipette or measuring tube 21 is carried by the walls of the chamber 13. The pipette is in the form of an elongated tube which has a predetermined length and bore whereby when it is filled, a predetermined volume is retained between the meniscuses formed at the two ends.

In accordance with the present invention, there is provided an automatic valve means. In the embodiment shown in FIGURE 1, a valve assembly 26 is placed at the upper part of the dome and serves to provide means of transferring air from the surrounds into the dome. However, the valve assembly prevents the escape of air from the dome to the surrounds. The valve includes a valve seat 27 which serves to receive the ball 28. The ball is spring loaded 29 and urged against the seat to prevent flow of air from the interior of the chamber 13 to the surrounds. However, when a partial vacuum is created within the chamber, the force of the spring is overcome and the spring is compressed, the ball is lifted from its seat, and air can flow inwardly into the chamber. The valve is so constructed that the partial vacuum required to open the valve is less than that which withdraws liquid from the measuring tube.

A valve which opens at a predetermined differential pressure can be made by appropriately selecting the projected area of the movable valve member, such as a ball, and the force which urges the movable member into its seat. The differential pressure required to operate the valve remains substantially constant as long as the valve seat and valve member are dry.

However, if the valve member and/or seat is wetted, the capillary forces which act along the line of contact between the movable valve member and seat will add to the forces which urge the valve member into seated position to increase the differential pressure required to open the valve.

If the length of line of contact which is wetted remains constant, the force required to open the valve remains constant. Under normal operating conditions, the length of the line of contact which is wetted will vary. Thus, the differential pressure required to open the valve will vary.

The total capillary force is related to the length of the line of contact. The length of the line of contact increases as a first approximation as the square root of the increase in projected area. To minimize the effect of variable capillary forces under working conditions, the projected area of the movable valve member is made relatively large.

Operation of the dispenser shown in FIGURE 1 is substantially as follows: The flask is squeezed causing the liquid 12 to rise in the tube 18 until it flows into the chamber 13 to submerge the end 31 of the pipette 21.

Air within the chamber escapes outwardly through the bore of the pipette 21 to the surrounds whereby the pressure inside and outside the chamber is substantially equal. However, when the fluid rises above the end 31 of the pipette, pressure begins to build up inside the chamber 31 and the fluid is forced outwardly to fill the pipette 21. When the pipette is full and fluid starts to drip from the end 32, the deformable bottle is released. Release of the bottle tends to draw the liquid downwardly into the reservoir. A partial vacuum is created within the chamber 13. When a suitable pressure differential, less than that required to withdraw fluid from the pipette, is established between the surrounding air and the interior of the chamber, the valve opens and allows air to flow inwardly. The pressure differential for opening the valve may be adjusted by selecting the spring 29 and the size (projected area) of the ball 28.

After the reservoir is released, a predetermined measured amount of fluid is retained in the pipette. For dispensing, the deformable reservoir is again squeezed and will serve to urge the liquid 12 upwardly into the chamber 13. However, since the bore 21 and valve 26 are closed, pressure will build up in the chamber and the liquid retained in the pipette is dispensed.

Thus, it is seen that the dispenser is simple in operation. By successive application of pressure to the reservoir 11 (squeezing of the deformable reservoir), a predetermined amount of fluid is dispensed.

Referring to FIGURE 2, another dispensing apparatus incorporating the invention is illustrated. The valving means comprises a tube 41 which has one end extending upwardly into the dome of the chamber 13 and the other end communicating with the surrounds.

A flexible flapper 42 is pivotally mounted on the end 43 of the tube. The flapper may, for example, be made of rubber, synthetic material, or the like. The flapper 42 normally seats against the end of the tube and prevents flow of air outwardly. However, when the pressure in the chamber is reduced, the flapper lifts to allow air to flow in from the surrounds. Operation of this embodiment is as previously described. As before, the area of the flapper should be such that sufficient forces are developed to open the flapper valve with a pressure differential less than that required to withdraw fluid from the measuring tube even when the seat is wetted. This can be achieved, as described above, by appropriately selecting the projected area of the flapper.

Thus, it is seen that there is provided a dispensing apparatus which is simple in construction and easy to operate.

I claim:

A dispensing apparatus for the delivery of measured volumes of liquid comprising a pipette of predetermined length and cross-sectional area whereby at its full state it will retain a predetermined volume of liquid, a reservoir serving to retain liquid, means forming a chamber, communication means for transferring the liquid between the reservoir and chamber, said pipette having one end extending into the chamber, automatic one-way valve means providing communication between the surrounds and the interior of the chamber to allow air to travel from the surrounds into the chamber, means for applying pressure in said reservoir to cause the liquid to rise into the chamber and submerge said one end of the pipette and flow outwardly into the pipette to fill the same, said valve means serving to admit air to said chamber to allow liquid in the chamber to flow downwardly into the reservoir upon removal of the pressure and automatically respond to subsequent application of pressure in said reservoir to deliver the contents from said pipette, said valve means opening under a differential pressure and closing when applying pressure in said reservoir, said valve means comprising a valve seat having an opening larger than the inside of said pipette, and a movable member formed to fit on the seat to close the valve, said movable member having a sufficiently large projected area, exposed in said valve seat, to minimize the effect of variations in the length of the line of wetted contact between the movable member and the seat upon the differential pressure required to open the valve whereby said differential pressure is less than that required to withdraw fluid from the pipette.

References Cited by the Examiner

UNITED STATES PATENTS

| 2,086,219 | 7/37 | Geyser | 222—509 X |
| 2,223,256 | 11/40 | Kross | 222—211 X |
| 2,645,388 | 7/53 | Hester | 222—454 |
| 2,974,528 | 3/61 | Sanz | 222—207 X |

LOUIS J. DEMBO, *Primary Examiner.*

LAVERNE D. GEIGER, RAPHAEL M. LUPO,
*Examiners.*